United States Patent [19]
Burba, III et al.

[11] Patent Number: 5,418,271
[45] Date of Patent: * May 23, 1995

[54] COATING COMPOSITION COMPRISING SOLIDS HAVING REVERSIBLE STRESS-INDUCED FLUIDITY

[75] Inventors: John L. Burba, III, Lake Jackson, Tex.; Peter A. Doty, Midland, Mich.; Christopher P. Christenson, Lake Jackson, Tex.; Susan K. Falcone, Clute, Tex.; Andrea H. Hazlitt, Lake Jackson, Tex.; Thomas M. Knobel, Hackensack, N.J.; Wilfred C. Meyer, Midland, Mich.; Arthur E. Read, Jr., Lake Jackson, Tex.; Edgar F. Hoy, Midland, Mich.; Avis L. McCrary, Lake Jackson, Tex.; Ha Q. Pham, Lake Jackson, Tex.; Stanley F. Simpson, Lake Jackson, Tex.; Steve A. Sims, Angleton, Tex.; Betty J. Smith, Brazoria, Tex.

[73] Assignee: The Dow Chemical Company, Midland, Mich.

[*] Notice: The portion of the term of this patent subsequent to Feb. 5, 2008 has been disclaimed.

[21] Appl. No.: 775,325

[22] Filed: Oct. 11, 1991

Related U.S. Application Data

[63] Continuation-in-part of Ser. No. 698,428, May 10, 1991, Pat. No. 5,196,143, and a continuation-in-part of Ser. No. 686,098, Apr. 16, 1991, Pat. No. 5,232,627, and a continuation-in-part of Ser. No. 526,970, May 16, 1990, Pat. No. 5,094,778, which is a continuation of Ser. No. 282,445, Dec. 9, 1988, abandoned, which is a continuation of Ser. No. 47,800, May 7, 1987, Pat. No. 4,790,954, which is a continuation of Ser. No. 752,326, Jul. 5, 1985, Pat. No. 4,664,843, and a continuation-in-part of Ser. No. 577,825, Sep. 4, 1990, Pat. No. 5,154,932, which is a continuation of Ser. No. 252,281, Sep. 4, 1990, abandoned, which is a continuation-in-part of Ser. No. 60,133, Jun. 9, 1987, Pat. No. 4,990,268, which is a continuation of Ser. No. 752,325, Jul. 5, 1985, abandoned, said Ser. No. 577,825, Continuation-in-part of Ser. No. 698,428, and a continuation-in-part of Ser. No. 686,098, and a continuation-in-part of Ser. No. 526,970, is a continuation of Ser. No. 282,445, Dec. 9, 1988, abandoned, which is a continuation of Ser. No. 47,800, May 7, 1987, Pat. No. 4,790,954, which is a continuation of Ser. No. 752,326, Jul. 5, 1985, Pat. No. 4,664,843, and a continuation-in-part of Ser. No. 568,450, Aug. 15, 1990, abandoned, and a continuation-in-part of Ser. No. 963,843, Oct. 20, 1992, abandoned, and a continuation-in-part of Ser. No. 577,405, Sep. 4, 1990, abandoned, and a continuation-in-part of Ser. No. 609,966, Nov. 6, 1990, Pat. No. 5,084,209.

[51] Int. Cl.$^6$ .......... B01J 13/00; C09D 5/04; C09K 3/18; C09K 7/04
[52] U.S. Cl. .......... 524/436; 252/25; 252/28; 252/70; 252/315.5; 252/315.7; 507/140; 523/457; 524/437; 524/916; 524/921; 526/932
[58] Field of Search .......... 252/184, 315.5, 315.7, 252/25, 28, 70; 507/140; 523/457; 524/436, 437, 916, 921; 526/932

[56] References Cited

U.S. PATENT DOCUMENTS

| | | | |
|---|---|---|---|
| 2,795,545 | 6/1957 | Gluesenkamp | 252/28 |
| 2,863,831 | 12/1958 | Thompson | 507/140 |
| 4,451,591 | 5/1984 | Kozak et al. | 523/457 X |
| 4,629,753 | 12/1986 | Quinn | 524/436 X |
| 4,664,843 | 5/1987 | Burba, III et al. | 252/315.5 |
| 4,790,954 | 12/1988 | Burba, III et al. | 252/315.5 |
| 4,910,246 | 3/1990 | Burba, III et al. | 524/399 |
| 4,990,268 | 2/1991 | Burba, III et al. | 252/315.7 X |
| 5,094,778 | 3/1992 | Burba, III et al. | 252/315.5 X |

FOREIGN PATENT DOCUMENTS 2396061  3/1979  France .......... 252/70

Primary Examiner—Richard D. Lovering
Attorney, Agent, or Firm—Walter J. Lee

[57] ABSTRACT

Coating formulations which behave as elastic solids having reversible stress-induced fluidity are prepared by creating a fluid having distributed therein effective amounts of ionic charge sites and countercharge sites. For instance, elastic solids having reversible stress- (Abstract continued on next page.)

induced fluidity are prepared by combining liquid formulations with a dispersion of a small, but effective, amount of at least one crystalline mixed metal hydroxide conforming substantially to the formula $$Li_m D_d T(OH)_{(m+2d+3+n \cdot a)}(A^n)_a \cdot xH_2O$$

where m is zero to one, D is a divalent metal, d is from zero to 4, T is a trivalent metal, A represents at least one anion or negative-valence radical of valence n and a is the amount of A, where n is 1 or more, $(m+2d+3+n \cdot a)$ is equal to or greater than 3, $(m+d)$ is greater than zero, and $xH_2O$ represents excess waters of hydration, if any. The coating formulations include, for example, paints, resin coatings, adhesives, de-icers, curable coatings, dryable coatings, and hardenable coatings.

27 Claims, No Drawings

COATING COMPOSITION COMPRISING SOLIDS HAVING REVERSIBLE STRESS-INDUCED FLUIDITY

CROSS REFERENCE TO RELATED APPLICATIONS

This is a continuation-in-part application of application Ser. No. 07/698,428, filed May 10, 1991, now U.S. Pat. No. 5,196,143, and of application Ser. No. 07/686,098, filed Apr. 16, 1991, now U.S. Pat. No. 5,232,627, and of continuation-in-part of pending application Ser. No. 07/526,970, filed May 16, 1990, now U.S. Pat. No. 5,094,778, which is a continuing application under 37 CFR 1.62 of Ser. No. 07/282,445, filed Dec. 9, 1988, (now abandoned) which is a continuing application of Ser. No. 07/047,800, filed May 7, 1987, now U.S. Pat. No. 4,790,954, which is a continuing application of Ser. No. 06/752,326, filed Jul. 5, 1985, now U.S. Pat. No. 4,664,843. All of these are incorporated by reference herein in their entirety.

This is also a continuation-in-part of application Ser. No. 577,825, filed Sep. 4, 1990, now U.S. Pat. No. 5,154,932, which is a continuation of Ser. No. 252,281, filed Sep. 4, 1990, (abandoned), which itself is a continuation-in-part of application Ser. No. 060,133, filed Jun. 9, 1987, now U.S. Pat. No. 4,990,268, which is a continuation of application Ser. No. 752,325, filed Jul. 5, 1985, (now abandoned). The above pending parent application Ser. No. 577,825, filed Sep. 4, 1990, now U.S. Pat. No. 5,154,932, is also a continuation-in-part of application Ser. No. 07/698,428, filed May 10, 1991, now U.S. Pat. No. 5,196,143, and of pending application Ser. No. 07/686,098, filed Apr. 16, 1991, and of continuation-in-part of application Ser. No. 07/526,970, filed May 16, 1990, now U.S. Pat. No. 5,094,778, which is a continuing application under 37 CFR 1.62 of Ser. No. 07/282,445, filed Dec. 9, 1988, (now abandoned) which is a continuing application of Ser. No. 07/047,800, filed May 7, 1987, now U.S. Pat, No. 4,790,954, which is a continuing application of Ser. No. 06/752,326, filed Jul. 5, 1985, now U.S. Pat. No. 4,664,843. All of these are incorporated by reference herein in their entirety.

This is also a continuation-in-part of application Ser. No. 07/568,450, filed Aug. 15, 1990, (abandoned) and of pending application Ser. No. 963,843, filed Oct. 20, 1992, and of application Ser. No. 07/577,405, filed Sep. 4, 1990, (abandoned), and of pending application Ser. No. 07/609,966, filed Nov. 6, 1990, now U.S. Pat. No. 5,084,209, which itself is related the above cited Ser. No. 060,133, now U.S. Pat. No. 4,990,268, which is a continuation of application Ser. No. 752,325, filed Jul. 5, 1985, (abandoned).

Other related patents are U.S. Pat. No. 4,822,421, U.S. Pat. No. 4,990,268; U.S. Pat. No. 4,999,025, and U.S. Pat. No. 5,015,409, this latter patent being a continuation-in-part of the above cited Ser. No. 060,133, now U.S. Pat. No. 4,990,268, which is a continuation of application Ser. No. 752,325, filed Jul. 5, 1985, now abandoned.

FIELD OF THE INVENTION

Coating compositions comprising elastic solids having stress-induced fluidity, which immediately revert to elastic solid state upon cessation of stress.

BACKGROUND OF THE INVENTION

It has been disclosed in the above-identified applications and patents that certain crystalline layered mixed metal hydroxides can be used in the modification of the viscosity of various fluid formulations. In some of the disclosures, the said mixed metal hydroxides are combined with clay, e.g. bentonite and others, to form adducts which are useful for viscosity modification of drilling fluids and other fluids. In some cases, the viscosity is said to be thixotropic, and in other cases the viscosity is merely said to be thickened or modified. Also, some of the above-identified pending applications disclose that fluids gelled by use of the crystalline layered mixed metal hydroxides will quickly re-gel after being subjected to shear.

In a paper prepared for presentation at the 1990 Drilling Conference of the International Association of Drilling Contractors/Society of Petroleum Engineers in Houston, Tex., Feb. 27–Mar. 2, 1990, the efficacy of using MMH (Mixed Metal Hydroxides) in a drilling mud are disclosed. The papery in its References section on page 5, refers to other papers about the use of MMH in drilling muds at meetings of the IAPC/SPE and SPE Symposium on Oilfield Chemistry in February–Mach 1989. These publications are cumulative to the information disclosed in U.S. Pat. Nos. 4,664,843 and 4,790,954, the publication of which pre-dates these papers.

None of the patents identified above disclose any recognition of an entirely novel type of viscosity effect which is not of the forms previously known, i.e, those known as dilatant, thixotropic, Newtonian, non-Newtonian, psuedo-plastic, Bingham plastic, or rheopexic.

We have now discovered more about these compounds and formulations containing them and have found that stress, rather than shear, produces a reversible phase change from a solid phase to a liquid phase, this is an unrecognized and unexpected phenomenon. In a manner of speaking, it is a phase metamorphosis, not a chemical metamorphosis.

This novel phenomenon is herein given the name of "stress-induced fluidity" as a means of identifying the reversible phase change effect on an elastic solid which readily becomes a relatively low-viscosity fluid under stress. The change from an elastic solid state to a fluid state begins as soon as an applied stress reaches or exceeds a critical strain point and the reversion to an elastic solid is immediate upon ceasing the stress; by "immediate" it is meant that the reversion to the elastic solid state is on the order of about one millisecond or less, essentially too fast for measurement using state of the art measuring devices. It is not the same effect as is obtained using shearing forces to break up a gel or a sol since those do not immediately return to the form of a gel or sol, (such as hydrogel, alcogel, organogel, or electrosol) though some may return to a gel or sol over a detectable period of time. Some of the various previously known forms of gels or sols may even undergo changes under shearing forces which interfere with a complete return to their previous form upon cessation of the shearing forces.

It has now been found that novel elastic solids having stress-induced fluidity are prepared by creating a fluid having distributed therein an effective amount of finely-divided colloids having ionic charge sites and also having distributed therein an effective amount of counter-ionic charge sites, the charge sites being present in a solvent in sufficient quantity to produce an elastic solid having stress-induced fluidity. Preferably, the ionic charge sites are anionic, the counter-ionic charge sites are cationic, and the chemical moieties containing the ionic sites comprise about 0.1 to about 50 percent of the total weight of the elastic solid.

This new discovery is perceived as a reversible phase change of an elastic solid composition having high energy, short range ionic interactions with a very low degree of reinforcement. Because of this a stress-induced fluidization of the elastic solid is reversible, since the high energy, short range interactions are not destroyed, and the low degree of reinforcement permits the fluidization until reversion back to an elastic solid.

These elastic solids having reversible stress-induced fluidity are perceived as being analagous, in their response to a critical strain, to a solid state diode in response to a critical flow of electrons.

SUMMARY OF THE INVENTION

Coating compositions comprising elastic solids having stress-induced fluidity are found to be useful in a variety of applications for obtaining useful effects in applying the compositions. Such compositions which benefit from the properties include a variety of coatings, adhesives, gels, resins, and fluids. The fluids comprise aqueous and organic fluids, such as paints, sealers, fillers, glues, protective coatings, temporary coatings, and the like, The fluids can be latex, dispersions, emulsions, solutions, acrylics, acrylates, resins, epoxies, urethanes, rubbers, alkyls, polyolefins, polyglycols, polyesters, polycarbonates, condensation polymers, polyethers, and the like. Temporary coatings, such as de-icing formulations for airplane wings awaiting take-off, can be formulated as elastic solids which can be blown off the wings by the total stress placed on the formulation by air currents during flight.

Notable among the compounds which are used in preparing these elastic solids, by being added to the desired fluid, are crystalline layered mixed metal hydroxides, including those prepared in aqueous systems, those prepared in non-aqueous systems, and those prepared in a combination of aqueous/non-aqueous systems. Also, adducts of the mixed metal hydroxides are found to be useful in preparing the elastic solids having stress-induced fluidity by being added to the desired fluid. Preferably the mixed metal hydroxides include aluminum as one of the metals, along with a divalent metal, especially magnesium, and, in some cases, including a monovalent metal, especially lithium. Furthermore, the crystalline layered mixed metal hydroxides may, at times, be called mixed metal oxy-hydroxides. The expression refers to a crystalline structure which contains at least two metals, not to a mere mixture of two metal oxides or two metal oxy-hydroxides. Most preferable are the crystalline mixed metal hydroxides, crystalline mixed metal oxides, and crystalline mixed metal oxy-hydroxides of Mg and Al. One can begin with anhydrous forms, if desired, and high-temperature activated forms of the mixed metal compounds can be used.

We have found that there are many coating compositions which become elastic solids exhibiting stress-induced fluidity when combined with an effective amount of at least one of the crystalline, mixed metal compounds disclosed herein. There are so many permutations of combinations of the mixed metal compounds and the fluids to which they are added to achieve stress-induced fluidity, that absolute numerical ranges are difficult to define. The amount of a given mixed metal compound of this present invention needed to produce an elastic solid having stress-induced fluidity can be easily determined by testing a few concentrations, usually less than about 10% by weight of the mixed metal compound in the total weight of the combined ingredients. A person skilled in these relevant arts of determining application properties of a coating composition will realize the significance of a unique coating formulation which is an elastic solid that becomes fluidized when subjected to stress and which immediately reverts to the elastic solid phase upon cessation of the fluidizing stress.

The instantly reversible fluidization of these unique elastic solids may be expressed as:

$\sigma = k_a \epsilon$, when $\epsilon < F$, for the solid phase; and $\sigma = f(d\epsilon'/dt)$ when $\epsilon' > F$, (this equation represents a generalized form for the usual rheological equations); for a cycle of $\epsilon$, $-xF < \epsilon < xF$, and when $\epsilon'$ equals 0 the liquid phase changes back to the solid phase, and where the symbol $\sigma$ represents stress; $k_a$ represents an elastic spring constant for the solid phase, $\epsilon$ and $\epsilon'$ are strain and F is critical strain.

DETAILED DESCRIPTIONS INCLUDING BEST MODE KNOWN

As used herein, the term "stress-induced fluidity" refers to the fluidization of an elastic solid upon application of a force which causes the elastic solid to undergo fluid movement rather than plastic deformation and which immediately recovers its elastic solid state upon cessation of the stress. Considering that a new concept of obtaining a phase change from an elastic solid to a stress-induced fluid which reverts back to an elastic solid phase is encountered here, then appropriate means of describing the phenomenon are attempted.

The term "plug flow" is used in the customary manner to indicate that flow is substantially uniform and monolithic along a flow path, even though there may be some laminar flow due to friction along the interface of the container in which there is flow and which tends to hold back ("drag") the fluid.

As used herein, the term "activated" (a term often used in the field of minerals and inorganic chemistry) refers to the heating (thermal activation) of metal hydroxides, hydrous metal oxides hydrotalcites, or magaldrates, sometimes in the presence of $CO_2$, to a temperature high enough to drive off the waters of hydration, leaving the metals as "active" metal oxides or oxyhydroxides.

In one aspect the present invention embodies the making of clay adducts with activated MMOH of the monolayer and the multi-layer variety as well as natural and synthetic hydrotalcites and other forms of activated mixed metal oxides or mixed metal oxy-hydroxides (all of which are referred to herein as AHMMO). The activated MMOH (hereinafter sometimes referred to as an AHMMO) and other AHMMO compounds, which are arid, are very friable (easily decrepitated), and easily disperse in water as very small crystals, generally of colloidal size.

For example, hydrotalcite is a naturally-occurring mineral (that contains some $CO_2$ in its structure) which, when thermally dehydrated, yields an active magnesium aluminum oxide compound or oxy-hydroxide compound. Also for example, magnesium hydroxide and aluminum hydroxide can be combined (especially in the presence of some $CO_2$) and heated to yield mixed metal oxides conforming essentially to the formula (MgO)$_x$·Al$_2$O$_3$, where the ratio of Mg/Al can vary over the range of about 0.01/1 to about 6/1, preferably about 0.5/1 to 4/1. Below that range the amount of MgO may not be sufficient to yield a mixed metal oxide which behaves efficiently in the present invention. Above about 4/1, the amount of excess MgO is likely to form a single metal oxide which is present with the mixed metal oxide structure, but as a separate phase.

If heating to ultra high temperatures is done, one may surpass the dehydration temperature at which the activated oxides are produced and can ceramicize or otherwise fuse the oxides into a substantially inert spinel. Selection of an appropriate dehydration temperature is within the skill of practitioners of the relevant arts, having learned of this disclosure. Generally, a dehydration temperature in the range of about 400° C. to about 700° C., often about 500° C. to 600° C., is generally sufficient to convert the metal compounds to their activated (dehydrated) oxide or oxy-hydroxide form. Activating other metal compounds (e.g. salts) to obtain the activated oxide form may require more time and/or higher temperature and a more ample supply of oxygen and/or OH$^-$ ions.

U.S. Pat. No. 4,748,139 discloses the thermal activation of mixed metal hydroxides at about 500° C. These activated mixed metal oxides were then made into dense spinel structures at above 1000° C. Examples are shown starting with Mg(OH)$_2$ mixed with NaAlO$_2$ and digested at 105° C. to form a layered magnesium hydroxide/aluminum hydroxide which forms MgAl$_2$O$_4$ when heated above 500° C. Also shown is the making of activated layered CoAl(OH)$_5$ plus Al(OH)$_3$ by starting with cobalt hydroxide and aluminum hydroxide. Further shown is the making of activity CoAl(OH)$_5$ by starting with CaO NaAlO$_2$. While this patent teaches the making of some activated mixed metal oxides with are useful in the presently disclosed invention, the patent does not teach the formation of an adduct of clay with the activated mixed metal oxides.

Natural clays and refined natural clays may vary from one mining location to another and the performance obtained with one batch may not exactly match the performance of another batch, the color may not match and the effect on viscosity may not match. The natural clays, and even refined natural clays, may contain impurities which can produce non-uniformity among batches and may create side-reactions with other ingredients in a formulation to which the clay is added. Clays are normally anionic and can react with ingredients which are cationic, such as cationic surfactants used in hair conditioners or in cleansers and the like.

We have found that activated mono-layered and multi-layered mixed metal hydroxides (MMOH) and other activated hydrous mixed metal oxides, all of which are referred to here as "AHMMO", especially those which are of layered crystalline structures exhibiting cationic surface charges, are beneficially employed as adducts with clay and with other compounds or materials which are anionic.

For purposes of conciseness, the expression "MMOH" will be used in this disclosure to refer to the crystalline mixed metal hydroxides which are described in detail below and the expression "AHMMO" will be used in reference to activated forms of the MMOH and activated forms of other hydrous metal oxides. The AHMMO compounds which are made from synthetically produced mixed metal compounds can be of substantially consistent quality and purity. AHMMO compounds made from naturally-occurring minerals, especially hydrotalcites, which can contain small or trace amounts of metal impurities besides the Mg and Al components, are particularly useful in the present invention.

The crystalline mixed metal hydroxides (MMOH) used in the present invention, to create activated mixed metal oxides or oxy-hydroxides, AHMMO, conform substantially to the empirical formula

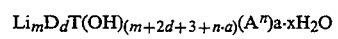

$$Li_m D_d T(OH)_{(m+2d+3+n\cdot a)}(A^n)_a \cdot xH_2O$$

where m is an amount of Li of from zero to one,
where D represents at least one divalent metal cation and d is an amount of from about zero to about 4,
where T represents at least one trivalent metal cation,
where A represents at least one monovalent or polyvalent anion or negative-valence radical,
a is an amount of A ions of valence n, with n·a being an amount of from about zero to about −3,
where (m+2d+3+n·a) is equal to or more than 3,
where (m+d) is not zero,
and where xH$_2$O represents excess waters of hydration, with x being zero or more.

In the above generic empirical formula, "excess waters of hydration" means that there is more water associated with the compound than is needed to supply the amount of hydroxyl ions in the crystal structure. When there is no excess water and x is essentially zero, the compounds, AHMMO, are very fine "activated" crystals having a cationic charge which are found to have a high affinity for forming adducts with anionic compositions such as clay when dispersed in an aqueous liquid.

In the above formula, it should be noted that n, being the valence of the anion or negative valence radical A, is a negative number; thus n·a is a negative number.

The AHMMO compounds are found to be beneficial as thickeners or viscosity-modifiers for aqueous-based functional products, such as cleansers, commercial products, household products, and personal care products when incorporated therein, as well as forming useful adducts with clay.

In one aspect, the present invention is perceived as being a formulation of the type described having incorporated therein the MMOH or AHMMO compounds.

In another aspect, the present invention is perceived as a means, method, or process for providing viscosity-modifiers or thickeners to the described formulations by incorporating therein the MMOH or AHMMO compounds, especially as adducts with clay.

A further aspect is that AHMMO compounds provide an elastic solid product which flows readily under even slight stress, but which reverts instantly to an elastic solid state when the stress is ceased. The re-thickening or gelling rate is perceived as being immediate. Liquid dispersions of clay adducts prepared in accordance with the present invention exhibit the novel rheological behaviour of exhibiting fluidity which is stress induced. That is, the liquid dispersion is essentially of a gelled consistency in the absence of any strain placed on it, but becomes quite fluid upon application of a stress. It exhibits neither Newtonian activity, nor thixotropic activity, nor dilatant activity, but instead it responds to a stress placed upon it by instantly becoming very fluid, then when the stress is removed it returns to its previous gelled consistency, which we refer to as an elastic solid.

While the elastic solids of the present invention are not limited to only clays or other siliceous compounds, there are many such compounds which are readily available and which are within the purview of the present invention. Fumed silica (as described in pending application Ser. No. 577,405 filed Sep. 4, 1990 now abandoned) is a particular form of $SiO_2$ which can be used, but is not a clay. Though there are many forms of clays, the clays preferred for use in the present adducts comprise the smectite clays, especially the bentonite-type, and montmorillonite clays. Even though this disclosure is based largely on the bentonite forms of clay, other forms and classes of clay are within the ambit of this invention, such as amorphous clay (e.g. of the allophane group) and crystalline clay (e.g. 2-layer, 3-layer expanding-type, non-expanding type, elongate-type, regular mixed layer type, and chain structure type). For example, a non-exhaustive listing of the clays is as follows:

| | | |
|---|---|---|
| bentonite | vermiculite | kaolinite |
| chlorite | halloysite | attapulgite |
| smectite | sepiolite | montmorillonite |
| palygorskite, | illite | Fuller's earth |
| saponite | and the like | |

The activated MMOH and AHMMO compounds useful in the present invention are preferably those of the monodispersed, monolayer variety such as described in parent parents U.S. Pat. Nos. 4,664,843 and 4,990,268 identified above. Compounds which are not of the monolayer varieties, but are of the multi-layer varieties, are shown, e.g., in U.S. Pat. Nos. 4,326,961; 4,333,846; 4,347,327; 4,348,295, 4,392,979; 4,446,201; 4,461,714; and 4,477,367. These multi-layered varieties in the activated form can be used in the present invention, or, if the crystals are in stacks of only a few layers in the unactivated form, they can be used.

The process, in general, for making the multi-layered varieties of mixed metal hydroxides involves starting with a soluble compound of a tri-valent metal and then reacting that with the desired soluble monovalent metal(s) and/or divalent metal(s) and converting the said compounds with a source of $OH^-$ ions, e.g., $NH_4OH$ at a temperature sufficient to create the multi-layered (generally 2-layer or 3-layer) crystalline mixed metal hydroxide. In contradistinction thereto, the crystalline monolayer mixed metal hydroxides are prepared by combining the desired metal compounds in solution in the desired ratio and then reacting the combination of metal compunds with a source of $OH^-$ ions at an appropriate temperature for producing the mixed metal hydroxide crystals.

Thus, for the most part, the MMOH compounds are prepared by the general process of forming a solution of compounds of the desired metals under appropriate conditions whereby a source of hydroxyl ions, e.g. ammonium hydroxide or caustic, reacts with the soluble metal compounds to produce the layered crystals of mixed metal hydroxides. In some instances, it is often best to avoid having residual ammonia in the product, in which case another hydroxy material, especially NaOH or KOH is used.

The process of using activated MMOH and AHMMO compounds to thicken aqueous-based functional products can be achieved in at least two general ways. One method, in generally involves adding to the MMOH and AHMMO particles an electrolyte; this is a form of "activation" other than thermal activation. In this process, the MMOH and AHMMO is first dispersed by using high shear, sonic waves or other methods known in the art to produce a high degree of dispersion of agglomerated particles. Once the material is dispersed in aqueous or partially aqueous media, a salt (electrolyte) is added either predissolved or dry and mixing/or shearing is continued until a smooth, thickened system is obtained. Other ingredients may be blended into the prethickened material. Often, one or more of the ingredients is a salt and a separate chemical activator is not needed. The salt used for chemical activation can be almost any ionic substance but components containing organic anions or multi-valent anions such as $CO_3^{-2}$, $PO_4^{-3}$, $P_3O_{10}^{-5}$, $C_2H_3O_3^-$ (glycolate) or hydroxy acetate, and the like, are usually more effective.

The other general method involves interaction with other colloidal particles in such a manner that they are linked together through bridges or bonds formed by the MMOH and AHMMO. In these cases, it can be interpreted as forming an adduct with the other particles. This can produce an "extension" effect. This can happen, for instance, when fumed silica or a clay is also an ingredient and less material is needed for thickening. This can also occur when a normally soluble material is included in the formulation beyond the point of saturation such that very small or colloidal particles are present as crystals or agglomerates. In this case, the thickening occurs when the MMOH or AHMMO and other particles are sheared together and agglomerates are broken, exposing fresh faces which react.

In the above described formula, the trivalent metal cation is preferably Al, Fe, or Ga, and can be mixtures of any of these, Al is most preferred as the trivalent metals.

The divalent metal cation is preferably Mg or Ca and can be mixtures of these; Mg is most preferred as the divalent metal.

The contents of the numerous formulations that can be thickened or modified by the addition of AHMMO compounds can be varied widely. Generally, the ingredients and levels of the ingredients which are in a given formulation have more to do with a desired effect other than that of thickening or viscosity-modification. The versatility of the AHMMO compounds is beneficial in that it can be added to so many formulations for viscosity purposes without interfering with the other ingredients in their intended purpose. Substitutions, replacements, and/or eliminations of one or more of the components (other than the AHMMO compound) often has little effect on thickening or viscosity-modification.

In the following examples the expression "MAH" is in reference to certain magnesium aluminum hydroxide compounds which are within the generic formula shown above and which conform substantially to the formula $MgAl(OH)_{5-y}Cl_y \cdot xH_2O$, with y being less than 0.5, and which are prepared from an aqueous solution containing $MgCl_2$ and $AlCl_3$ as taught, e.g., in parent U.S. Pat. No. 4,664,843. The small amount of $Cl^-$ anion is a residual amount of the $Cl^-$ anion which was in the starting materials.

ILLUSTRATIVE EMBODIMENTS

The following examples are given to illustrate embodiments of the invention and should not be interpreted as limiting it in any way. Unless stated otherwise, all parts and percentages are given by weight.

CLAY ADDUCTS

The following examples are given to illustrate adducts of clay with AHMMOs; however, the invention is not limited to only the ones illustrated.

EXAMPLE 1

One gram (1 g) of thermally activated MMOH (hydrotalcite) powder which conforms essentially to the empirical formula $Mg_dAlO_a \cdot (OH)_x$ is mixed with 350 g of an aqueous 1.2% sodium bentonite clay dispersion to form an adduct. The mixture is mixed in a Hamilton Beach mixer for 15 minutes*. At this point, 0.5 g of 5 normal NaOH is added with stirring. After 2 minutes, the pH is found to be 10.5. The fluid thickens and rheological properties are determined with a Fann 35 Viscometer**.

| Yield Point | 42 lb/100 ft$^2$ |
|---|---|
| Plastic Viscosity | 13 centipoise |
| 6 rpm reading | 10 Fann Units |
| 3 rpm reading | 8 Fann Units |

*Standard procedure for mixing totest with Fann 35 Viscometer
**Standard procedure for measuring rheological properties The above results illustrate an extended bentonite clay very useful as a drilling mud component due to its relatively high yield point and its low viscosity upon application of stress. Because of this the adduct, when used as a drilling mud component, is able to hold drilling solids in suspension even when stress is removed to let the drilling mud come to rest.

EXAMPLE 2

The above procedure is followed using only the clay dispersion and is tested for its rheological properties.

| Yield Point | 2 lb/100 ft$^2$ |
|---|---|
| Plastic Viscosity | 3 centipoise |
| 6 rpm reading | 0 Fann Units |
| 3 rpm reading | 0 Fann Units |

The above results are indicative of a non-extended clay which has poor rheological properties; it flows too easily and does not have enough viscosity to hold drilling solids in suspension.

EXAMPLE 3

Added 0.15 parts of thermally activated MAH powder to about 350 parts water along with 5 parts bentonite clay to form an adduct. The mixture is mixed in a Hamilton Beach mixer for 15 minutes*. 5N NaOH solution is added, with stirring, to pH 9.0. The fluid thickens and rheological properties are determined with a Fann 35 Viscometer**.

| Yield Point | 25 lb/100 ft$^2$ |
|---|---|
| Plastic Viscosity | 4 centipoise |
| 6 rpm reading | 15 Fann Units |
| 3 rpm reading | 13 Fann Units |

*Standard procedure for mixing to test with Fann 35 Viscometer
**Standard procedure for measuring rheological properties The above results illustrate an extended bentonite clay very useful as a drilling mud component due to its relatively high yield point and its low viscosity upon application of stress. Because of this the adduct, when used as a drilling mud component, is able to hold drilling solids in suspension even when stress is removed to let the drilling mud come to rest.

EXAMPLE 4

The above is repeated except that the pH is brought to 10.5. The fluid thickens and rheological properties are determined with a Fann 35 Viscometer**.

| Yield Point | 75 lb/100 ft$^2$ |
|---|---|
| Plastic Viscosity | 5 centipoise |
| 6 rpm reading | 26 Fann Units |
| 3 rpm reading | 20 Fann Units |

*Standard procedure for mixing to test with Fann 35 Viscometer
**Standard procedure for measuring rheological properties The above results illustrate an extended bentonite clay very useful as a drilling mud component due to its relatively high yield point and its low viscosity upon application of stress. Because of this the adduct, when used as a drilling mud component, is able to hold drilling solids in suspension even when stress is removed to let the drilling mud come to rest.

To the above adduct of pH 10.5 is added sufficient HCl, with stirring to bring the pH to 9.0 and re-tested:

| Yield Point | 25 lb/100 ft$^2$ |
|---|---|
| Plastic Viscosity | 5 centipoise |
| 6 rpm reading | 26 Fann Units |
| 3 rpm reading | 20 Fann Units |

Though dropping the pH to 9.0 from the original 10.5 lowers the yield point, the efficacy of the adduct as a drilling component is not destroyed.

EXAMPLE 5

A sample of mineral hydrotalcite of the general formula $6MgO \cdot Al_2O_3 \cdot CO_2 \cdot 12H_2O$ is heated in a porcelain crucible to a dehydrated state at about 500° C. for several hours. The so-produced AHMMO material is found to be friable. It creates an exotherm, pH increases, and a colloidal dispersion results when placed in water. Into 50 parts of water is place 0.1 part of the AHMMO and mixed with bentonite clay to form and adduct as in the above examples, then tested as shown above.

| Yield Point | 50 lb/100 ft$^2$ |
|---|---|
| Plastic Viscosity | 12 centipoise |
| 6 rpm reading | 11 Fann Units |
| 3 rpm reading | 7 Fann Units |

The so-formed adduct is found to be useful as a drilling mud component. The data just above indicates viscosity properties better than clay alone.

EXAMPLE 6

$MgCl_2$ and sodium aluminate at 1/1 molar ratio are reacted in water, aq. NaOH is added to pH 9.5. An insoluble precipitate forms which is filtered, washed, and dried to dehydration at 500° C. for 2 hours. When dispersed in water a colloidal dispersion forms. The so-formed activated hydrous mixed metal oxide (0.1 parts) is mixed with bentonite (5 parts) to form an adduct in water (to total 350 parts) and tested as shown above.

| Yield Point | 50 lb/100 ft$^2$ |
|---|---|
| Plastic Viscosity | 12 centipoise |
| 6 rpm reading | 11 Fann Units |
| 3 rpm reading | 7 Fann Units |

The data indicate that the adduct is useful as a drilling mud component.

RESIN FORMULATIONS

In one aspect, this invention is a coating composition comprising a polymeric resin and a mixed metal hydroxide, wherein the mixed metal hydroxide is present in an amount, based on the weight of the composition, of at least about 0.01 percent to about 10 percent, and can be as much as 50 percent, but is preferably in the range of about 1 percent to about 10 percent.

This invention provides a means whereby good fluid flow control is achieved in, e.g., polymeric resin coatings. Resinous coating compositions of the present invention resist flowing under static conditions much better than a resin without added mixed metal hydroxide. However, surprisingly, the coating composition, being an elastic solid, instantly flows upon the application of enough stress (which is a slight amount) to produce a critical strain which does not exceed, or only minimally exceeds, the force necessary to cause a coating resin, without added mixed metal hydroxide, to flow as an ordinary rheological fluid would be expected to flow when force or shear is applied.

Suitable polymeric resins for use in the preparation of the composition of the invention include any organic polymeric liquid which exhibits stress-induced fluidity upon the addition of up to about 50 percent by weight of a mixed metal hydroxide. The term "stress-induced fluidity" as used herein means that flow is dependent on stress, not on shear.

Examples of suitable organic polymeric liquids include epoxy resins, polymeric isocyanate-reactive compounds, urethanes, hydrophilic polymers, polyethers, polyesters, and the like, urethanes, hydrophilic polymers, polyethers, polyesters, and the like. One method of preparing a composition of the invention comprises, e.g., a mixed metal hydroxide dispersion added to the organic polymeric liquid and mixed therewith, preferably under high shear. The mixed metal hydroxide is added to the polymeric resin in an amount sufficient to provide an elastic solid which exhibits reversible stress-induced fluidity. Preferably, the mixed metal hydroxide is added in an amount of at least about 0.01 percents more preferably at least about 1 percents and most preferably at least about 5 percent, and is preferably no greater than about 50 percents more preferably no greater than about 20 percent, and most preferably no greater than about 10 percent. Following the addition and mixture of the mixed metal hydroxide to the polymeric resins the organic solvent used to prepare the mixed metal hydroxide dispersion is then preferably removed from the resin, preferably to a level of less than about 1 percent by weight. The removal of most of the solvent is desirable in order to prevent it from reacting or hindering the reaction of any component in a resin formulations such ass for examples an epoxy resin adhesive formulation. The solvent may be removed by any suitable techniques such as, for examples vacuum distillation.

Suitable epoxy resins which can be employed herein include any epoxy-containing compound which contains an average of more than one vicinal epoxide group per molecule. The epoxide groups can be attached to any oxygen, sulfur or nitrogen atom or the single bonded oxygen atom attached to the carbon atom of a —COO— group in which said oxygen, sulfur or nitrogen atom or the carbon atom of the —COO— group is attached to an aliphatic, aromatic or cycloaliphatic hydrocarbon group which hydrocarbon group can be substituted with any inert substituent including, but not limited to, halogen atoms, preferably chlorine or bromine, nitro groups and the like or such groups can be attached to the terminal carbon atoms of a compound containing an average of more than one —(O—CHR$^a$—CHR$^a$—)n group where each R$^a$ is independently hydrogen or an alkyl or haloalkyl group, containing from 1 to about 2 carbon atoms, with the proviso that only one R$^a$ group can be a haloalkyl group, and n has a value from 1 to about 100, preferably from 1 to about 20, more preferably from 1 to about 10, most preferably from 1 to about 5.

Particularly suitable epoxy resins which can be employed herein include those compounds having an average of more than one vicinal epoxide group per molecule, such as, for example, glycidyl ethers or glycidyl amines.

Examples of such resins include the diglycidyl ethers of resorcinol, bisphenol A, bisphenol F, bisphenol K, bisphenol S, bisphenol AP (1,1-bis(4-hydroxyphenyl)-1-phenylethane), dihydroxydiphenylmethane, 3,3',5,5'-tetrabromobisphenol A, 4,4-thiodiphenol, 4,4'-sulfonyldiphenol, 4,4'-dihydroxydiphenyl oxide, 3-phenylbisphenol A, 3,3',5,5'-tetrachlorobisphenol A, 3,3'-dimethoxybisphenol A, dipropylene glycol, poly(propylene glycol)s, thiodiglycol; the triglycidyl ether of tris(hydroxyphenyl)methane; the triglycidyl ether of p-aminophenol; the tetraglycidyl ether of 4,4'-diaminodiphenylmethane; the polyglycidyl ether of a phenol or substituted phenol-aldehyde condensation product (novolac); the polyglycidyl ether of a dicyclopentadiene or an oligomer thereof and phenol or substituted phenol condensation product; the advancement reaction products of the aforesaid di- and polyglycidyl ethers with aromatic di- or polyhydroxyl- or di- or polycarboxylic acid containing compounds including, for example, bisphenol A (4,4'-isopropylidenediphenol), o-, m-, p-dihydroxybenzene, 2,4-dimethylresorcinol, 4-chlororesorcinol, tetramethylhydroquinone, 1,1-bis(4-hydroxyphenyl)ethane, bis(4,4'-dihydroxyphenyl)methane, 4,4'-dihydroxydiphenyl ether, 3,3',5,5'-tetramethyl-dihydroxydiphenyl ether, 3,3',5,5'-dichlorodihydroxy-diphenyl ether, 4,4'-bis(p-hydroxyphenyl isopropyl)-diphenyl ether, 4,4'-bis(p-hydroxyphenoxy)benzene, 4,4'-bis(p-hydroxyphenoxy)diphenyl ether, 4,4'-bis(4(4-hydroxyphenoxy)phenyl sulfone)-diphenyl ether, 4,4'-dihydroxydiphenyl sulfone, 4,4'-dihydroxydiphenyl sulfide, 4,4'-dihydroxydiphenyl disulfide, 2,2'-dihydroxydiphenyl sulfone, 4,4'-dihydroxydiphenyl methane, 1,1-bis(p-hydroxyphenyl)cyclohexane, 4,4'-dihydroxybenzophenone, phloroglucinol, pyrogallol, 2,2',5,5'-tetrahydroxydiphenyl sulfone, tris(hydroxyphenyl)methane, dicyclopentadiene diphenol, tricyclopentadiene diphenol, terephthalic acid, isophthalic acid, p-hydroxybenzoic acid; mixtures thereof and the like.

Representative polyepoxide compounds containing a mesogenic or rodlike moiety include, for example, the diglycidyl ethers of 4,4'-dihydroxy-biphenyl, 4,4'-dihydroxystilbene, 4,4'-dihydroxy-diphenylacetylene, 4,4'-dihydroxydiphenylazomethine, 4,4'-dihydroxyazobenzene, 4,4'-dihydroxyazoxybenzene, 4,4'-bis((4-hydroxy)phenoxy)diphenyl, 4,4'-dihydroxy-alpha-methylstilbene, 3,3',5,5'-tetramethyl-4,4'-dihydroxydiphenyl, 3,3',5,5'-tetrachloro-4,4'-dihydroxydiphenyl, 2,2',6,6'-tetramethyl-4,4'-dihydroxydiphenyl, 4,4'-dihydroxybenzanilide, 4,4'-dihydroxychalcone, 4,4'-diamino-alpha-cyanostilbene. 4-hydroxyphenyl-4hydroxybenzoate, 4,4'-dihydroxy-3,3',5,5'-tetrabromo-alpha-methylstilbene, bis(N,N'-4-hydroxyphenyl)terephthalamide, the diglycidyl ethers of the dihydric phenols, tetraglycidyl amines of 4,4'-diamino-alphamethylstilbene, 4,4'-diaminostilbene, 4,4'-diaminobenzanilide, 4,4'-diaminoazobenzene, 4,4'-diamino-alpha-cyanostilbene. Also suitable are the products resulting from advancing the aforementioned diglycidyl ethers with aromatic dihydroxyl or dicarboxylic acid containing compounds including, for example, all of the previously listed diphenol precursors to the diglycidyl ethers containing a mesogenic or rodlike moiety, mixtures thereof and the like.

The epoxy resins which can be employed herein can be prepared by reacting the corresponding di- or polyhydroxyl containing compound (or amine containing compound) with an epihalohydrin by any suitable means known to those skill ed in the art. Suitable such methods are disclosed by Lee and Neville in Handbook of Epoxy Resins, McGraw-Hilly (1967); Japan Kokai Tokkyo Koho JP 62 86,484 (87 96, 484); EP 88-008358/92 and Journal of Applied Polymer Science, Vol. 23, 1355–1372 (1972) all of which are incorporated herein by reference.

When the polymeric resin is an epoxy resin, the mixed metal hydroxide is preferably added to the polymeric resin in an amount of at least about 0.1 weight percent, more preferably at least about 1.0 weight percent; and is preferably no greater than about 12 weight percent, more preferably no greater than about 7 weight percent.

When the polymeric resin is an epoxy resin, the composition of the invention is useful for applications wherein the epoxy resin alone is useful, but is especially useful in applications wherein an epoxy resin with enhanced solid phase/liquid phase properties are desired. One such application is for an adhesive or coating, wherein enhanced sag control prior to the adhesive or coating reaching a tack-free state is desired. It has been discovered that when a mixed metal hydroxide as described above is added to an epoxy resin, the resulting composition, while in a tack-free state, has good sag resistance, but will still flow under critical stress. The composition is therefore easily applied as a coating or a thin bead of adhesive, yet will resist sagging, even when applied to a vertical surface.

Suitable polymeric isocyanate-reactive compounds includes any organic compound having at least two isocyanate-reactive moieties, such as a compound containing an active hydrogen moiety, or an imino-functional compound. For the purposes of this invention, an active hydrogen moiety refers to a moiety containing a hydrogen atom which, because of its position in the molecule, displays significant activity according to the Zerewitnoff test described by Wohler in the Journal of the American Chemical Society, Vol. 49, p. 3181 (1927). Illustrative of such active hydrogen moieties are —COOH, —OH, —NH$_2$, —NH—, —CONH$_2$, —SH, and —CONH—. Typical active hydrogen containing compounds include polyols, polyamines, polymercaptans and polyacids. Suitable imino-functional compounds are those which have at least one terminal imino group per molecule, such as are described, for example, in U.S. Pat. No. 4,910,279, which is hereby incorporated by reference in its entirety. Preferably, the isocyanate-reactive compound is a polyol.

Suitable polyols include, for example, polyether polyols, polyester polyols, poly(alkylene carbonate)polyols, hydroxyl-containing polythioethers, polymer polyols, and mixtures thereof. Polyether polyols are well known in the art and include, for example, polyoxyethylene and polyoxypropylene diols and triols which are prepared by reacting an unsubstituted or halogen- or aromatic- substituted ethylene oxide or propylene oxide with an initiator compound containing two or more active hydrogen groups such as water, ammonia, a polyalcohol, or an amine. Such methods are described, for example, in U.S. Pat. Nos. 4,269,945, 4,218,543, and 4,374,210, which are hereby incorporated by reference in their entirety. In general, polyether polyols may be prepared by polymerizing alkylene oxides in the presence of an active hydrogen-containing initiator compound. Most preferred, however, are ethylene oxide-capped polyols prepared by reacting glycerine with propylene oxide or a mixture of ethylene oxide and propylene oxide, followed by reacting with ethylene oxide.

Suitable alkylene oxides include ethylene oxide, propylene oxide, butylene oxides, styrene oxide, epichlorohydrin, epibromohydrin, and mixtures thereof. Suitable initiator compounds include watery ethylene glycol, propylene glycol, butanediol, hexanediol, glycerin, trimethylol propane, pentaerythritol, hexanetriol, sorbitol, sucrose, hydroquinone, resorcinol, catechol, bisphenols, novolac resins, phosphoric acid, amines, and mixtures thereof.

Polyester polyols are also well-known in the art and may be prepared by reacting a polycarboxylic acid or anhydride thereof with a polyhydric alochol. Examples of suitable polycarboxylic acids include succinic acid, adipic acid, suberic acid, azelaic acid, sebacic acid, pthalic acid, isophthalic acid, maleic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, maleic acid anhydride, glutaric acid anhydride, fumaric acid, and mixtures thereof. Examples of suitable polyhydric alcohols include ethylene glycols, propane diols, butane diols, 1,6-hexanediol, 1,8-octanediol, neopentylglycol, glycerol, trimethylol propane, pentaerythritol, quinitol, mannitol, sorbitol, methyl glycoside, diethylene glycol, triethylene glycol, tetraethylene glycol, polyethylene glycols, polypropylene glycols, and mixtures thereof.

Among the useful polymer polyols are included dispersions of polymers of vinyl monomers in a continuous polyol phase, particularly dispersions of styrene/acrylonitrile copolymers. Also useful are the so-called polyisocyanate polyaddition (PIPA) polyols (dispersions of polyurea-polyurethane particles in a polyol) and the polyurea dispersions in polyols (PHD polyols). Copolymer polyols of the vinyl type are described, for example, in U.S. Pat. Nos. 4,390,645, 4,463,107, 4,148,840 and 4,574,137, all incorporated by reference. Preferred are polyether polyols and copolymer polyols of the vinyl type, particularly styrene/acrylonitrile dispersions.

When the polymeric resin is a polymeric isocyanate-reactive compound, the mixed metal hydroxide is preferably added to the polymeric resin in an amount of at least about 0.1 weight percent, more preferably at least about 1.0 weight percent, and is preferably no greater than about 20 weight percent, more preferably no greater than about 10 weight percent.

When the polymeric resin is a polymeric isocyanate-reactive compound, the composition of the invention is useful for any application in which such compounds are useful, but is especially useful in applications wherein an isocyanate-reactive composition with enhanced rheological properties is desired. Such applications include, for example, one-part and two-part urethane adhesives and sealants, and for storage-stable polyols with fillers or additives in suspension.

EXAMPLE 7

MMOH in Epoxy Resin

A sample of MMOH conforming essential to the empirical formula $MgAl(OH)_{4.7}Cl_{0.3} \cdot xH_2O$ is washed with water to assure the substantial absence of impurities. It is washed on a Buchner funnel using vacuum to remove water and is then washed with methanol (ca. 4 to 5 times volume) in the funnel, still using vacuum to draw the liquids from the sample. The final product contains about 8.7% methanol.

A portion of the MMOH/methanol product is added to a commercially available epoxy resin, DER-736 (a product of The Dow Chemical Company), such that the MMOH comprises about 10% by weight of the mixture. The DER-736 has an initial viscosity in the range of 30–60 cP.

The resulting MMOH/methanol/epoxy resin mixture is then subjected to high shear to disperse the MMOH particles using a sonicator for about 30 seconds. After sonication, the material is placed in an open container in a vacuum oven held at about 60° C. and 25 mm Hg reduced pressure to substantially volatilize methanol from the mixture. After that, the total remaining methanol is less than 3% by weight. This final product is found to possess the unique property of being an elastic solid having stress-induced fluidity. This is applied as a coating onto a substrate by spreading it, and upon ceasing the spreading, it reverts instantly to an elastic solid and holds its position.

EXAMPLE 8

MMOH in Epoxy Resin

In similar manner to the above Example 7, DER-331, which has a viscosity typically in the range of 12,000–13,500 cP is used instead of the low viscosity DER-736. Following the procedures of above Example 7, this formulation is also found to exhibit the stress-induced fluidity.

EXAMPLE 9

MMOH in Epoxy Resin

Some MMOH/methanol product as described in Example 7 above is washed with acetone (ca. 4 to 5 times by volume) to remove methanol and there is obtained a product comprising 5.6% by weight MMOH slurried in acetone. The so-formed slurry is mixed with epoxy resin DER-736 in an amount to provide about 10% by weight MMOH in the final mixture. The resulting MMOH/acetone/resin mixture is subjected to high shear applied by a sonicator to disperse the particles of MMOH. Following the procedures of above Example 7, the formulation is also found to exhibit stress-induced fluidity.

EXAMPLE 10

MMOH/Epoxy Formulations on Substrates

MMOH/epoxy resins prepared as above are found to be easily applied to substrate by a mild stress force, and then revert to an elastic solid upon cessation of the stress force. Thus, a layer or a bead of the product is easily applied for use as an adhesive and as a protective coating. Curings agents or other accelerators are easily provided in the formulations to provide for curing or crosslinking of the resins.

EXAMPLE 11

Epoxy/Urea Formaldehyde Resin Formulations

Into a quart-size metal container is weighed 367 gms of epoxy resin (EEW of 337.8) of The Dow Cheimcal Company and 7.66 gms. of American Cyanamid's Beetle 216 urea-formaldehyde resin. The resins are mixed using a Dispersator (Premier Mill Corp.) at 3000 rpm for 10 minutes. About 160.34 gms of Dupont's Ti-Pure R-960 $TiO_2$, about 267.24 gms of Gouverneur Tal Co. Inc.'s IT5XTALC (magnesium silicate) are added to the resin mixture and mixed with the same Dispersator for 10 minutes at 3000 rpm. The mixture is allowed to come to room temperature and about 34.56 gms of xylene, 41.04 gms of methyl isobutyl ketone (MIBK) and 32.40 gms of n-butonal are then added and mixed for 1 minute with the Dispersator. About 86.28 gms of a pre-mixed curing agent mixture composed of 8 parts of Henkel's Versamid 253 and 2 parts of The Dow Chemical Company's DEH-58 epoxy curing agent are then added and the formulation again mixed for 1 minute with the Dispersator at 3000 rpm. The Amine Hydrogen Equivalent Weight (AHEW) of the curing agent mixture is 79.41.

The above formulation is then divided into 5 equal samples containing 250 gms each and mixed metal hydroxide (MMOH) is added to 4 of the samples, then mixed with the Dispersator for 1 minute. The MMOH used is a slurry containing about 98% watery about 1.4% sodium-bentonite clays and about 0.6% MMOH.

Control: no MMOH/clay slurry added/for comparison.

Sample A: about 0.625 gms of MMOH/clay slurry added.

Sample B: about 1.250 gms of MMOH/clay slurry added.

Sample C: about 1.875 gms of MMOH/clay slurry added.

Sample D: about 2.500 gms of MMOH/clay slurry added.

The sag resistance properties of portions of the samples are tested using a Paul N. Gardner Company, Inc.'s Leneta anti-sag meter to draw down coatings on a Leneta paint test chart form #2C. The draw-down chart is immediately turned in a vertical position and hung to dry. Anti-sag ratings are read where coating stripes begin to merge together. Coatings that sag at higher film thickness are considered to have better anti-sag properties. Film thickness where sagging begins, measured in mils (1 mil=0.001 inch=0.0254 mm):

Control: 8–10 mils (0.2032–0.254 mm)

Sample A: 14–16 mils (0.3556–0.4064 mm)
Sample B: 16–18 mils (0.4064–0.4572 mm)
Sample C: 16–18 mils (0.4064–0.4572 mm)
Sample D: 20–22 mils (0.508–0.5588 mm)

The above data indicate that anti-sagging properties of the coatings are significantly improved with the addition of the MMOH/clay slurry.

Other portions of the above samples are sprayed on a set of 12 inch by 4 inch unpolished cold roll steel panels (#20 gauge) and on a set of 8 inch by 4 inch sandlasted (1.5–2.0 mil profile) cold roll steel panels (#16 gauge). The sprayed panels are hung in a vertical position for 5 minutes and visually inspected for sag.

Control: severe sag
Sample A: slight sag
Samples By C, and D exhibit no sag

The sprayed panels are cured in a convection oven at 50° C. for 48 hours. The unpolished samples are used for testing impact, elongation, solvent resistance (ethyl methyl ketone double rubs) and pencil hardness. The sandblasted panels are used for testing chemical resistance, adhesion, and salt fog. Spraying is done using a #18 Binks conventional spray gun with a #67 or 68 needle/cap assemble using an air pressure of 75 psi and a cup pressure of about 5–10 psi. (1 psi=6.894757 kilopascals).

The following set of properties are measured on each formulation set:

Dry film thickness, ASTM-D1186, Fischerscope, Multi 650C
MEK double rub, ASTM-D4752
Pencil hardness, ASTM-D3363, 6H,5H,4H,3H,2H,H,F,HB,B,2B, 3B,4B,5B,6B
Impact test, ASTM-G14, Gardner impact
Flexibility, ASTM-D522, Conical Mandrel, Elongation
Salt spray (fog), ASTM-D117
Elcometer adhesion, ASTM-D4541
Stormer viscosity, ASTMK-D-562
Dispersion, ASTM-D1210, Hegman Gauge
Chemical resistance is measured as follows:
1. Select the set of chemicals to be used in the spot test (e.g. 5% sulfuric acid, 5% hydrochloric acid, 5% acetic acid, 5% sodium hypochlorite, 5% nitric acid, 5% sodium hydroxide, toluene, gasoline, etc.).
2. Cut small squares of the absorbent cotton fabric (about 5 mm by 5 mm) and position them in rows and columns on the surface of the test panels.
3. Add several drops of a selected chemical to each absorbent cotton square lined up in one row (there should be at least 5 of these).
4. Cover each of these test patches with a 1 inch diameter watch glass and seal it with hot paraffin wax.
5. Repeat steps 3 and 4 for each selected test chemical.
6. Remove the watch glasses and examine the surface of the coating under the test chemical for discoloration, blistering, delamination, and softenine using a hand held medium size standard screwdriver tip.
7. The rows of test spots are normally unvocered and observed (evaluated) on the following time schedule: 24, 48, 72, 96, and 168 hours (total of 7 days).
8. Use the following key to report the condition of the coating at the times stated in step 7:

| | |
|---|---|
| 4 = no change | 3 = discoloration |
| 2 = softened | 1 = blistered |
| 0 = delaminated | D — Dry (test chemical evaporated) |
| VS = very slight | S = slight |
| X = extreme/severe | |

9. If a condition is achieved before the final observation, report the time it first occurred in hours inside a set of parenthesis. An example of an observation is 2VS(24). This means that there was very slight softening at the end of the test but the condition of very slight softening was first seen at the 24 hour observation.

Test results are shown below:

| Test Made | Control | Sample A | Sample B | Sample C | Sample D |
|---|---|---|---|---|---|
| Dry film, mils | 7.3 | 6.9 | 7.5 | 6.3 | 6.9 |
| MEK double rubs | 200 | 200 | 200 | 200 | 200 |
| Pencil hardness | 6B | 6B | 6B | 6B | 6B |
| Impact, psi. | 148 | 140 | 140 | 140 | 140 |
| flexibility (% elong.) | 39.5 | 39.5 | 39.5 | 39.5 | 39.5 |
| 5% $H_2SO_4$ | Ox | Ox | Ox | Ox | Ox |
| 5% acetic acid | Ox | Ox | Ox | Ox | Ox |
| 5% bleach | 2x | 2x | 2x | 2x | 2x |
| 5% NaOH | 2x | 2x | 2x | 2x | 2x |
| Toluene | Ox | Ox | Ox | 0x | 0x |
| Gasoline | 2x | 2x | 2x | 2x | 2x |

The above results indicate that the MMOH slurries gave excellent improvement in sag resistance properties which maintains the protection properties of the coatings.

EXAMPLE 12

Water-Borne Polyurethane Coatings

The mixed metal hydroxides added, at 0.5% (Sample A) and 1% (Sample B) concentrations to water-borne polyurethane coating formulations described in U.S. Pat. No. 4.895,894 improve the coating formulations by substantially increasing the mils thickness at sag from 4–6 (Control sample with no MMOH added) to 12–14 mils (Sample A) and 16–18 (Sample B) thickness at sag. The control, by visual inspection, exhibits severe sag whereas the Sample A and Sample B (formulated with MMOH) exhibits no visual sag. Further data are shown below:

| Sample | MEK rub | Reverse Impact | T-bend | Pencil hardness | Knoop Resistance hardness | abrasion |
|---|---|---|---|---|---|---|
| Control | 60 | 160 | 0 | 4H | 2.8 | 115.7 |
| A | 60 | 160 | 0 | HB | 3.1 | 114.1 |
| B | 60 | 160 | 0 | HB | 10.1 | 85.1 |

The data demonstrate that the addition of the MMOH improved the performance of the coatings significantly. In addition to its anti-sagging properties, the MMOH unexpectedly gave a harder coating with higher abrasion resistance.

DE-ICING COMPOSITIONS

Deicing fluids can be classified as Type I and Type II fluids. Both fluids consist of glycol mixtures, but Type II fluids also contain a gelling agent that will impart sufficient viscosity to hold the fluid on an air craft surface until it approaches lift-off velocity. At that time, the fluid should flow off the plane. Current Type II fluids are gelled with derivatives of polyacrylamide compounds which require special pumping equipment and high purity water in order to mainatain desired properties. It has now been determined that deicing fluid, with MMOH added, becomes an elastic solid which exhibits substantial improvement in holdover times, do not require special pumping equipment since the gell is readily fluidized by the stress place on it by the force of the pumping equipment, yet immediately reverts to an elastic solid upon cessation of the pumping force, and is not deleteriously affected by the presence of salts, such as $Na_2CO_3$, $NaNO_3$, etc. which actually can enhance the gelling properties. The testing of de-icing fluids is done in accordance with methods described in *AEA Material Specification DE-/ANTI-ICING, AIRCRAFT, APPENDIX A*, Revision E: Sep. 1st, 1990 which is a publication of the Association of European Airlines.

EXAMPLE 13

De-Icing Composition

Three samples of thickened de-icing fluid are prepared as follows, using MMOH conforming essentially to the empirical formula $MgAl(OH)_{4.7}Cl_{0.3}$:

A. One part by weight of 10 wt % MMOH in water is added to about 2.83 parts by weight of 146AR commercial de-icing flud and sheared in a Waring Blender at about 35,000 sec$^{-1}$ for about 10 minutes. The pH is about 10.3, plastic viscosity is about 1.9 Pascal-Second, Bingham Yield Value is about 0.110 Pascals, and conductivity is aout 1680 micromhos.

B. Same as A above, except that about 1.88 parts by weight of the deicing fluid are added. The Ph is about 9.9, plastic viscosity is about 2.0 Pascal-Second, Bingham Yield Value is about 0.120 Pascals, and conductivity is about 1730 micromhos.

C. Same as A above, except that about 1.3 parts by weight of deicing fluid are added. The pH is about 10.0, plastic viscosity is about 1.5 Pascal-Second, Bingham Yield Value is about 0.332 Pascals, and conductivity is about 2230 micromhos.

The formulations are found to have properties which permit them to remain on the surface of an air planer but which can be blown off the plane in flight, where de-icing is then controlled by de-icing equipment.

EXAMPLE 14

De-Icing Composition

A sample of MMOH is used as in A of the above example, except that it contains $NO_3$, as a counter ion instead of the $Cl^-$. The viscosity is found to be relatively low until $NaCO_3$ is added to the mixture. It is found to thicken markedly, demontrating that the addition of various salts can enhance the rheological performance of the fluid, thus avoiding the need for purified water. The material is found to be suitable for de-icing purposes, the gel having a holdover time greater than available commercial fluids containing about 3% of a hydrophylic polymer which provdes hold over times of about 7 minutes, as measured by th AEA material specification

EXAMPLE 15

De-Icing Compositions

Four samples of de-icing fluid are prepared with ethylene glycol and MMOH according to Example 11 above and tested in accordance with the AEA methods.

Sample (a) is 1% by wt. of MMOH and hold over is 13 min.

Sample (b) is 2% by wt. of MMOH and hold over is 20 min.

Sample (c) is 3% by wt. of MMOH and hold over is 90 min.

Sample (d) is 4% by wt. of MMOH and hold over is 90 min.

In comparison, a commercial fluid containing 3% of a hydrophylic polymer as a thickener, exhibits a hold over time of about 7 minutes after which time additional de-icing material would need to be added if the plane is still waiting to take off.

PAINT FORMULATIONS

In order to perform properly, most latex or dispersion paints require carefully controlled rheological properties. The paint at rest is preferably thick or viscous enough to prevent settling of the pigments and dispersed polymer particles which can result in agglomeration of the particles in the bottom of the container. Sometimes the agglomeration ruptures the protective surfactant coating on the dispersed particles of polymer and the particles do not return to their finely dispersed form. The thickeners which are employed to protect the dispersivity of polymer particles are usually selected to give a high degree of thixotropicity to the paints. The thixotropicity provides a thickened paint which is easily sheared by the paint brush or other applicator and resists dripping and running. Whereas the present invention involves a novel viscosity effect (by forming an elastic solid state) which is different from the thixotropic paints (which are thick fluids), it nevertheless provides highly useful paint formulations because it can accomplish the same purpose in an improved manner and can be used even in paint solutions which are used in producing transparent coatings on substrates.

EXAMPLE 16

Latex Paint

The following commonly-known ingredients are used to prepare a flat interior tint base latex paint:

| Ingredients | lbs/100 gals. | = | kg/378.5 liter |
|---|---|---|---|
| water | 370.2 | | 167.92 |
| Methocel* J40MS | 5.0 | | 2.268 |
| (mix 5 to 10 minutes, then add:) | | | |
| Dowicil* 75 | 2.0 | | 0.907 |
| Tamol* 731 | 4.0 | | 18.14 |
| KTPP* | 1.0 | | 0.4536 |
| AMP*-95 | 1.0 | | 0.4536 |
| Triton*-N-101 | 2.2 | | 0.998 |
| Ethylene Glycol | 18.6 | | 8.437 |
| Texanol* | 7.9 | | 3.583 |
| Colloids 643* | 0.9 | | 0.408 |
| (mix well, then add:) | | | |
| Tipure* R-900 | 150.0 | | 68.04 |
| Satintone* No. 1 | 150.0 | | 68.04 |
| No. 1 white | 125.0 | | 56.7 |
| Celite* 499 | 25.0 | | 11.34 |
| (Grind 20 minutes) | | | |

-continued

| Ingredients | lbs/100 gals. | = | kg/378.5 liter |
|---|---|---|---|
| Latex** | 292.5 | | 132.678 |
| Triton* N-101 | 4.4 | | 1.996 |
| Colloids* 642 | 1.8 | | 0.816 |

*Trademarks known by latex paint formulators
**comprises about 45% polymer dispersed in water The above paint formulation, though exhibiting thixotropic properties, tends to sag when applied to vertical surfaces. The same formulation, with about 0.5% of crystalline mixed metal hydroxide (viz MgAl(OH)$_{4.7}$Cl$_{0.3}$) added becomes an elastic solid having stress-induced fluidity and reverts to the elastic solid state when stress is ceased and is non-sagging on a vertical surface onto which it is applied as a coating.

What is claimed is:

1. A coating composition comprising an elastic solid which exhibits a reversible stress induced phase transition to a liquid state, said composition comprising
   (a) a fluid having distributed throughout finely divided particles having surface ionic charge sites, in admixture with
   (b) an effective amount of colloidal particles having counter ionic surface charges effective to form an elastic solid when at rest, and which becomes fluid under stress,
   said amount being an amount at least sufficient to produce said elastic solid, as expressed by:
   $\sigma = k_a \epsilon$, when $\epsilon < F$, for the solid phase; and
   $\sigma = f(d\epsilon'/dt)$ when $\epsilon > F$,
   for a cycle of $\epsilon$, $-xF < \epsilon' < xF$, and
   when $\epsilon'$ equals 0 the liquid phase changes back to the solid phase, and
   where the symbol $\sigma$ represents stress; $k_a$ represents an elastic spring constant for the solid phase, $\epsilon$ and $\epsilon'$ are strain and F is critical strain.

2. The composition of claim 1 wherein the ionic properties distributed throughout the fluid are cationic charges and the counter-ionic charges are anionic, thus creating the elastic solid.

3. The composition of claim 1 wherein the fluid containing the particles having ionic charges dispersed therein is an aqueous medium which is converted to an elastic solid by the addition of the colloidal particles.

4. The composition of claim 1 wherein the fluid containing the particles having ionic charges dispersed therein is an organic medium which is conversed to an elastic solid by the addition of the colloidal particles.

5. The composition of claim 1 wherein the fluid containing the particles having ionic charges dispersed therein is predominantly an organic medium, containing a non-dominant amount of aqueous fluids which is converted to an elastic solid by the addition of the colloidal particles.

6. The composition of claim 1 wherein the fluid containing the particles having ionic charges dispersed therein is predominantly an aqueous medium, containing a non-dominant amount of organic fluid, which is converted to an elastic solid by the addition of the colloidal particles.

7. The composition of claim 1 wherein the fluid containing the particles having ionic charges dispersed therein is a polymeric material.

8. The composition of claim 1 wherein the fluid containing the particles having ionic charges dispersed therein is a resinous material.

9. The composition of claim 1 wherein the fluid containing the particles having ionic charges dispersed therein is at least one resinous material selected from the group consisting of epoxy resin, novolac resin, urethane resin, vinyl resin, acrylate resin, acrylic polymer, polycarbonate, polyester resin, polyalkylene oxide, polyolefin, polyether, polyhydroxy compound, and polyarylene.

10. The composition of claim 1 wherein the fluid containing the particles having ionic charges dispersed therein is a solvent for a resinous or polymeric material and which contains a resinous or polymeric material.

11. The composition of claim 1 wherein the fluid containing the particles having ionic charges dispersed therein is an aqueous fluid having dispersed therein a finely divided polymeric or resinous material.

12. A coating composition comprising an elastic solid which exhibits reversible stress-induced fluidity, said composition comprising
    (a) a fluid system as a continuous phase, and
    (b) as a discontinuous fine particle phase, a crystalline mixed metal hydroxide conforming essentially to the empirical formula $$Li_mD_dT(OH)_{(m+2d+3+na)}(A^n)_a \cdot xH_2O$$

where m is an amount, in the range of zero to about 1, of Li cations,
   D represents divalent metal cations, d is an amount of D and is in the range of zero to about 4,
   T represents a unit amount of trivalent metal cations,
   A represents monovalent or polyvalent anions or negative-valent radicals of valence $-n$, with a being the amount of A anions;
   $m+d$ is greater than zero and $(m+2d+3+na)$ is equal to or greater than 3,
   and x is zero or more if there are excess waters of hydration,
   said discontinuous phase being essentially uniformly distributed in the fluid system in an amount which produces a gel which has the characteristics of an elastic solid having stress-induced fluidity.

13. The coating composition of claim 12 wherein the fluid system comprises an organic material.

14. The coating composition of claim 12 wherein the fluid system comprises at least one organic material selected from the group consisting of polymers, resins, oils, greases, and waxes.

15. The coating composition of claim 12 wherein the fluid system comprises an aqueous material.

16. The coating composition of claim 12 wherein the fluid system comprises at least one aqueous material selected from the group consisting of solutions, dispersions, suspensions, colloids, emulsions, and water.

17. The coating composition of claim 12 wherein the fluid system comprises at least one liquid, silicon compound of the group consisting of, silicones, silicate compounds, polysilane compounds, polysilicates, siloxanes, silylamino compounds, silylene compounds, silyidene compounds, and silylthio compounds.

18. The coating composition of claim 12 wherein the fluid system comprises a fluid system which contains, in the continuous phase, at least one dispersed material, colloidal material, suspended material, or emulsified material.

19. The coating composition of claim 12 wherein the D metal is at least one selected from the group consisting of Mg, Ca, Sr, and Ba, the T metal is selected from the group consisting of Al, Fe, and Ga, and the A anion is at least one selected from the group consisting of hydroxy, oxyhydroxy, alkoxy, aryloxy, and halooxy.

20. The coating composition of claim 12 wherein the value of m is in the range of about 0 to about 1, the value of d is in the range of about 0.5 to about 4, and the amount of A is in the range of zero to about 2.

21. The coating composition of claim 12 wherein the mixed metal hydroxide comprises monolayered, monodispersed crystals.

22. The coating composition of claim 12 wherein the mixed metal hydroxide comprises

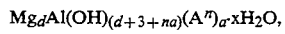
$Mg_dAl(OH)_{(d+3+na)}(A^n)_a \cdot xH_2O$, where d is an amount in the range of about 0.5 to about 4, na is a negative amount in the range of about zero to about 2, and x is an amount of from zero to about 2.

23. The coating composition of claim 12 wherein the mixed metal metal hydroxide essentially comprises $MgAl(OH)_5$.

24. The coating composition of claim 12 wherein the mixed metal hydroxide comprises $Mg_dAl(OH)_{(d+3+na)}(A^n)_a \cdot xH_2O$, where d is an amount in the range of about 0.5 to about 2, na is a negative amount in the range of about zero to about 1, and x is an amount of from zero to about 2, and is of the monolayered, monodispersed variety.

25. A process for converting a fluid to an elastic solid having reversible stress-induced fluidity, said process comprising dispersing in the fluid an effective amount of a crystalline mixed metal hydroxide of the formula

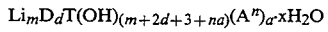
$Li_m D_d T(OH)_{(m+2d+3+na)}(A^n)_a \cdot xH_2O$ where m is an amount, in the range of zero to about 1, of Li cations, D represents divalent metal cations, d is an amount of D and is in the range of zero to about 4, T represents a unit amount of trivalent metal cations, A represents monovalent or polyvalent anions negative-valent radicals of valence $-n$, with a being the amount of A anions;

m+d is greater than zero and (m+2d+3+na) is equal to or greater than 3, and x is zero or more if there are excess waters of hydration, thereby obtaining an elastic solid composition having reversible stress-induced fluidity and having the property of immediately recovering its elastic solid state after being caused to flow by applying stress to the elastic solid, the said effective amount being an amount sufficient to provide phase changes which are expressible as:

$\sigma = k_a \epsilon$, when $\epsilon < F$, for the solid phase; and $\sigma = f(d\epsilon'/dt)$ when $\epsilon' > F$, (this equation represents a generalized form for the usual rheological equations); for a cycle of $\epsilon$, $-xF < \epsilon < xF$, and when $\epsilon'$ equals 0 the liquid phase changes back to the solid phase, and where the symbol $\sigma$ represents stress; $k_a$ represents an elastic spring constant for the solid phase, $\epsilon$ and $\epsilon'$ are strain and F is critical strain.

26. The process of claim 25 wherein the numerical of m is zero, of d is about 0.5 to about 2, of na is zero to about 0.5, and of x is zero to about 2.

27. The process of claim 25 wherein the crystalline mixed metal hydroxide comprises $MgAl(OH)_{(5+na)}(A^n)_a$ with little or no excess waters of hydration.

* * * * *